US009344956B2

(12) United States Patent
Ganapathy

(10) Patent No.: US 9,344,956 B2
(45) Date of Patent: May 17, 2016

(54) COMMUNICATION SYSTEM

(75) Inventor: Suresh Ganapathy, Sutton (GB)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 14/238,182

(22) PCT Filed: Jul. 2, 2012

(86) PCT No.: PCT/JP2012/067411
§ 371 (c)(1),
(2), (4) Date: Feb. 10, 2014

(87) PCT Pub. No.: WO2013/024643
PCT Pub. Date: Feb. 21, 2013

(65) Prior Publication Data
US 2014/0171074 A1    Jun. 19, 2014

(30) Foreign Application Priority Data

Aug. 12, 2011  (GB) .................................... 1113939.1

(51) Int. Cl.
*H04W 4/00*       (2009.01)
*H04W 48/16*     (2009.01)
*H04W 8/18*       (2009.01)
*H04W 84/04*     (2009.01)
*H04W 88/08*     (2009.01)

(52) U.S. Cl.
CPC .............. *H04W 48/16* (2013.01); *H04W 8/186* (2013.01); *H04W 84/045* (2013.01); *H04W 88/08* (2013.01)

(58) Field of Classification Search
CPC .................................................... H04W 60/06
See application file for complete search history.

(56) References Cited

U.S. PATENT DOCUMENTS

2011/0188453 A1*  8/2011  Choi et al. .................... 370/328

FOREIGN PATENT DOCUMENTS

| JP | 2010-213273 A | 9/2010 |
|----|---|---|
| WO | WO 2010/053166 A1 | 5/2010 |
| WO | WO 2010/071374 A1 | 6/2010 |
| WO | WO 2010/088558 A1 | 8/2010 |
| WO | WO 2010/110520 A1 | 9/2010 |
| WO | WO 2011/047587 A1 | 4/2011 |
| WO | WO 2011/088623 A1 | 7/2011 |

OTHER PUBLICATIONS

3GPP Draft, TSG SA WG2 Meeting # 71, TD S2-091571, WAS 1292_TEMP_CSG_v2, Feb. 16-20, 2009, Budapest, Hungary. Nortel, Temporary CSG Membership.
3GPP TS 36.413 v10.2.0 (Jun. 2011) 3d Generation Partnership Project; Technical Specification Group Radio Access Network; Evolved Universal Terrestrial Radio Access Network (E-UTRAN); S1 Application Protocol (S1AP), (Release 10).
3GPP TS 22.011 v8.9.0. (Sep. 2009) 3d Generation Partnership Project; Technical Specification Group Services and System Aspects; Service Accessibility (Release 8).

(Continued)

*Primary Examiner* — Justin Lee
(74) *Attorney, Agent, or Firm* — McGinn IP Law Group, PLLC.

(57) ABSTRACT

A communication system is described in which a base station operating in a hybrid or closed access mode requests deletion of the copy of the CSG-Id list maintained at the corresponding mobility management entity in the core network, when the base station changes its operation mode to an open (non-CSG) access mode.

18 Claims, 9 Drawing Sheets

(56) References Cited

OTHER PUBLICATIONS

3GPP TS 23.003 v10.2.0. (Jun. 2011) 3d Generation Partnership Project; Technical Specification Group Core Network and Terminals; Numbering, Addressing and Identification (Release 10).

Japanese Office Action dated Nov. 19, 2014 with a partial English translation thereof.

Motorola, Clarify when the Config data takes effect at eNB in Config Update Procedure, 3 GPP TSG-RAN WG3 Meeting #63bis, Mar. 18, 2009, R3-090900, URL, http://3gpp.org/ftp/tsg_ran/WG3_lu/TSGR3_63bis/docs/R3-090900.zip.

Japanese Office Action dated May 13, 2015 with a partial English translation thereof.

* cited by examiner

COMMUNICATION SYSTEM

TECHNICAL FIELD

The present invention relates to mobile telecommunication networks, particularly but not exclusively networks operating according to the 3rd Generation Partnership Project (3GPP) standards or equivalents or derivatives thereof. The invention has particular although not exclusive relevance to the management of the handover of a mobile device from one base station to another.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HNB to refer to any such home base station and will use the term NodeB generically to refer to other base stations (such as the base station for the macro cell in which a HNB operates). The HNB will provide radio coverage (for example, 3G/4G/WiMAX) within the home, small and medium enterprise, shopping Malls etc and will connect to the core network via a suitable public network (for example via an ADSL link to the Internet) or operator network and in the case of the 3GPP standards, via an optional HNB gateway (HNB-GW) which typically will aggregate traffic from several HNBs.

An HNB may be configured to operate using one of a plurality of access modes, namely: 'closed' in which the HNB operates as a closed subscriber group (CSG) cell; 'hybrid' in which the HNB operates as a CSG cell where at the same time, non-members are allowed access; and 'open' in which the HNB operates as a normal (non-CSG) cell.

The HNB and a mobility management entity (MME) in the core network maintain a list of Closed Subscriber Group Identifiers (CSG-Ids) currently assigned to the given HNB. Each CSG-Id identifies a closed subscriber group comprising a single cell or a collection of cells within a radio network that is open to only a certain group of subscribers. The HNB sends the list of its CSG-Ids to the MME over the S1 interface, the details of which are described in the 3GPP Standards TS 36.413 version 10.2.0 (2011-06-24): "S1 Application Protocol (SLAP) (Release 10)". The MME stores the received CSG-Id list for the given HNB.

When the mobile device (also known as User Equipment, UE) is a member of a subscriber group, the CSG-Id for that group is added to a white list, which is stored by the UE and the MME. At the time a connection is established between a UE and a HNB, the HNB sends an initial UE message to the MME in the core network. Where the HNB is configured to operate in a closed or hybrid mode, the initial UE message includes a closed subscriber group identifier, CSG-Id, for the UE. The MME performs access control based on the CSG-Id received in the initial UE message and the CSG-Id list received on the S1 interface from the HNB and the CSG-Id list stored for the UE in the Home Subscriber Server (HSS). If the MME can verify that the CSG-Id received in the initial UE message is on the white list for the given UE, and that the given HNB is open to the subscriber group indicated by this CSG-Id, then the UE is allowed access.

Further details of the CSG-Id and the mobility aspects and cell selection procedures are described in the 3GPP Standards TS 23.003 version 10.2.0 (2011-06-15): "Numbering, addressing and identification (Release 10)" and 3GPP Standards TS 22.011 version 8.9.0 (2009-10-01): "Service accessibility (Release 8)" documents.

SUMMARY

The above 3GPP Standards documents describe the procedures at the HNB and the MME in case the list containing the CSG-Ids changes, for example, when the cells of the HNB are added to or removed from a CSG-Id. In short, the current procedure is such that in order to add CSG-Ids to the list stored in the MME, the HNB sends a new list containing all its current CSG-Ids, including new CSG-Ids that are to be added to the list and also the CSG-Ids that are to be maintained on the list. In order to register changes in the CSG-Id list, the MME, when receiving the new list, discards the previous list and saves the received new list. Thus, in order to delete any CSG-Ids, the HNB needs to send a list containing all CSG-Ids except the CSG-Ids which are to be removed. However, the inventors have identified a problem with this current procedure—when one HNB operating in the closed subscriber group access mode or the hybrid access mode changes to the open (non-CSG) access mode, there is no way to inform the MME to discard the existing list of CSG-Ids without sending a new list; and as the HNB is now operating in the open mode, there is no CSG-Id list at the HNB to send. Further, if the HNB omits the CSG list from its communication with the MME, the MME does not know that the current list needs to be discarded. Thus there exists a need to overcome this problem.

Although for efficiency of understanding for those of skill in the art, the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Accordingly, preferred embodiments of the present invention aim to provide methods and apparatus which overcome or at least alleviate the above issues.

In an aspect there is provided a communications node for use in a communications network having a core network and a base station that can communicate with a plurality of mobile devices, the base station having a membership based access mode and a non-membership based access mode, the communications node comprising a memory for storing a list of membership identifiers associated with the base station when the base station is operating in said membership based access mode; a communication module for receiving a configuration message from the base station indicating that the base station has changed from the membership based access mode to the non-membership based access mode; a control module operable to process the received configuration message and to determine that the base station has changed from said membership based access mode to the non-membership based access mode and, in response to such determination, to delete the stored list of membership identifiers associated with the base station.

In one embodiment, the configuration message indicates that the base station has changed from the membership based access mode to the non-membership based access mode by not including a list of membership identifiers in the message. In another embodiment, the configuration message indicates that the base station has changed from the membership based access mode to the non-membership based access mode by including data indicating the change of mode to said non-membership based access mode.

In one aspect there is provided a communications node for use in a communications network having a core network and a base station that can communicate with a plurality of mobile devices, the base station having a membership based access mode and a non-membership based access mode, the communications node comprising a memory for storing a list of membership identifiers associated with the base station when the base station is operating in said membership based access mode; a communication module for receiving a configuration message from the base station, the configuration message comprising one or more membership identifiers to be deleted from said list; and a control module for deleting said one or more membership identifiers from the list of membership identifiers stored in said memory.

In one embodiment, the configuration message further includes one or more membership identifiers to be added to the list stored in the core network and wherein said control module is arranged to add said one or more membership identifiers to the list of membership identifiers stored in said memory. In another embodiment, the configuration message further includes one or more membership identifiers to be maintained in the list stored in the core network and wherein said control module is arranged to maintain said one or more membership identifiers to be maintained, in the list. The configuration message may comprise an ENB Configuration Update Message.

In an LTE system, the communications node is a mobility management entity.

According to another aspect there is provided a communications node for use in a communications network having a core network and a base station that can communicate with a plurality of mobile devices, the base station having a membership based access mode and a non-membership based access mode, the communications node comprising a memory for storing a list of membership identifiers associated with the base station when the base station is operating in said membership based access mode; a communication module for receiving a configuration message from the base station indicating whether the communication node should update, maintain or delete the list of membership identifiers stored in said memory; and a control module operable to process the received configuration message and to update, maintain or delete the membership list stored in said memory in dependence upon the received configuration message.

The control module may be arranged to update the membership list by over-writing the list with a list contained within the received configuration message. The control module may be arranged to maintain the membership list by keeping the stored list of membership identifiers. The control module may be arranged to delete the membership list by removing the list from memory to leave no list of membership identifiers stored in the memory for the base station.

In another aspect there is provided a base station for communicating with a plurality of mobile devices and a core network, the base station having a membership based access mode and a non-membership based access mode and comprising a mobile subscriber registration module configured to register mobile subscribers for connection to the core network via the base station; a management module configured to manage a list of membership identifiers associated with the base station when the base station operates is said membership based access mode; and a base station registration module configured to send configuration messages to the core network; wherein the management module is configured to delete the list of membership identifiers when the access mode of the base station changes to the non-membership based access mode, and wherein the base station registration module is configured to send a configuration message to the core network indicating that the base station has changed from the membership based access mode to the non-membership based access mode.

The configuration message may indicate that the base station has changed from the membership based access mode to the non-membership based access mode by not including a list of membership identifiers in the message. Alternatively, the configuration message may indicate that the base station has changed from the membership based access mode to the non-membership based access mode by including data indicating the change of mode to said non-membership based access mode.

In a further aspect there is provided a base station for communicating with a plurality of mobile devices and a core network, the base station having a membership based access mode and a non-membership based access mode and comprising a management module configured to manage a list of membership identifiers associated with the base station when the base station operates in said membership based access mode; a base station registration module configured to send a configuration message to the core network, the configuration message comprising the list of membership identifiers for storage in the core network; wherein the base station registration module is configured, in response to a change in the list of membership identifiers by the closed subscriber group management module, to send a subsequent configuration message to the core network comprising one or more membership identifiers to be deleted from the list stored in the core network.

In one embodiment, the configuration message further includes one or more membership identifiers to be added to the list stored in the core network. The configuration message may further include one or more membership identifiers to be maintained in the list stored in the core network.

The membership based access mode may comprise either a closed subscriber group access mode or a hybrid access mode and the non-membership based access mode may comprise an open access mode.

In a further aspect there is provided a base station for communicating with a plurality of mobile devices and a core network, the base station having a membership based access mode and a non-membership based access mode and comprising a management module configured to manage a list of membership identifiers associated with the base station when the base station operates in said membership based access mode; a base station registration module configured to send a configuration message to the core network, the configuration message comprising the list of membership identifiers for storage in the core network; wherein the base station registration module is configured, in response to a change in the list of membership identifiers by the closed subscriber group management module, to send a subsequent configuration message to the core network indicating whether the core network should update, maintain or delete the list of membership identifiers stored in the core network.

The invention also provides a communications system comprising a plurality of mobile devices, a base station as in the aspects and possibilities described above; and a mobility management entity according to any of the aspects and possibilities described above.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings in which.

DETAILED DESCRIPTION OF EXEMPLARY EMBODIMENTS

Overview

Figure 1:
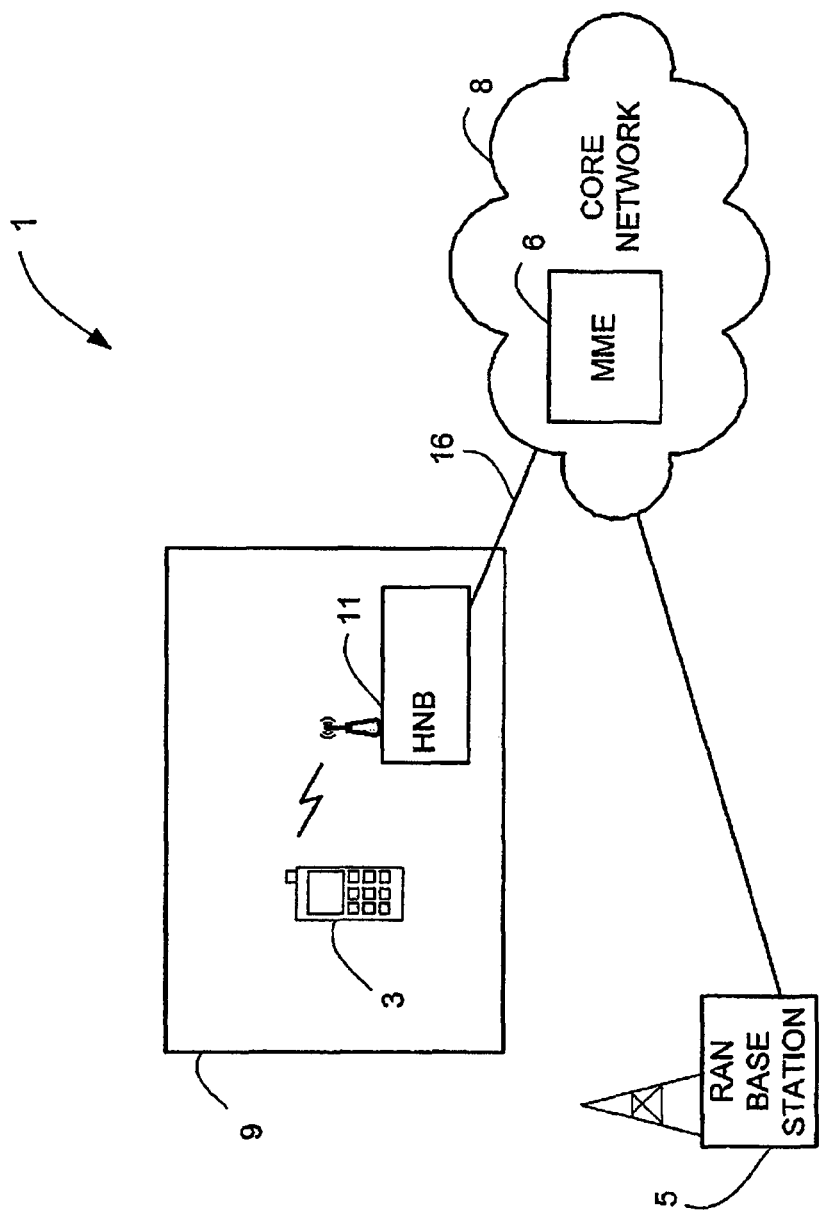
FIG. 1 schematically illustrates a mobile telecommunication system.

FIG. 1 schematically illustrates a mobile (cellular) telecommunication system 1 in which a user of a mobile telephone 3 (or other User Equipment (UE)) can communicate with other users (not shown) via a macro cell of a 3G Radio Access Network (RAN) base station 5 and a core telephone network 8. The UE 3 may also be allowed to access a 'home' base station (HNB) 11 based cell 9, when in the coverage area of the HNB 11. In this example, the HNB 11 is directly coupled to the core telephone network 8, but it might also be coupled by a public data network (e.g. the internet) via an optional home base station gateway (not shown).

In this example, the HNB 11 can operate in a 'closed' mode in which only the members of one or more closed subscriber groups (CSGs) associated with the HNB 11 are allowed access. The HNB 11 can also operate in a 'hybrid' mode in which both members and non-members of the CSGs associated with the HNB 11 are allowed access. In both of these operating modes, the HNB 11 maintains a list of CSG-Ids, the members of which are allowed access. If the subscriber group that the UE 3 belongs to is on this list, the UE is allowed access. If it is not on the list, then the UE 3 is not allowed access when operating in the closed mode and is only allowed access as a "non-member" when operating in the hybrid mode. The HNB 11 can also operate in an 'open' mode, in which any UE 3 is allowed access, regardless whether or not the UE 3 is a member of a closed subscriber group.

As is well known, a UE 3 may enter and leave the cell 9 associated with the HNB 11 as the UE 3 is moving around in the geographical area covered by the telecommunication system 1. In order to keep track of the UEs and to facilitate movement between the different base stations, the core network 8 comprises a mobility management entity (MME) 6 which is in communication with the base stations coupled to the core network 8.

Home Base Station

Figure 2:
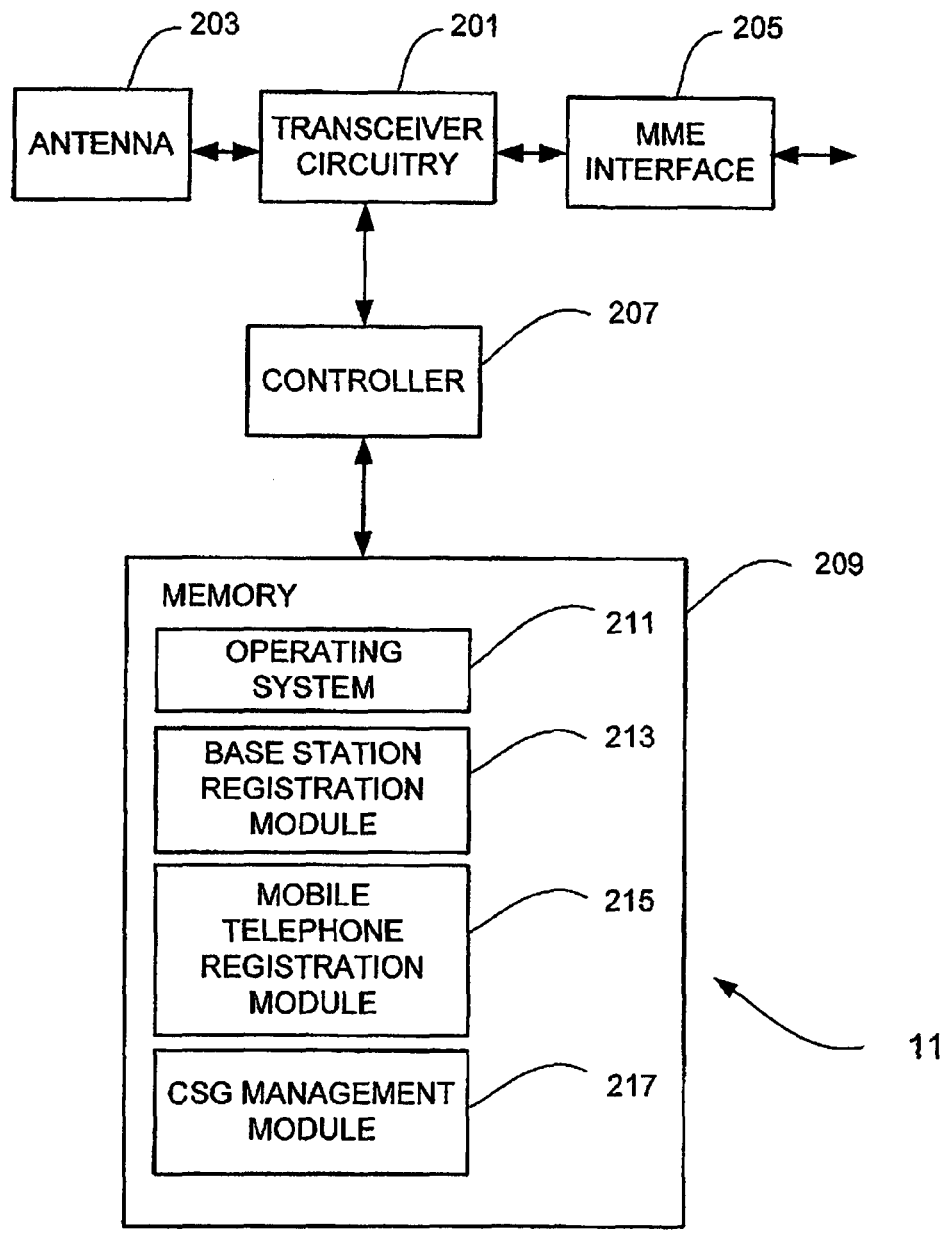
FIG. 2 is a block diagram of a home base station forming part of the system shown in FIG. 1.

FIG. 2 is a block diagram illustrating the main components of the home base station (HNB) 11 shown in FIG. 1. As shown, the HNB 11 includes transceiver circuitry 201 which is operable to transmit signals to, and to receive signals from, the UE 3 via one or more antennae 203 and which is operable to transmit signals to and to receive signals from the MME 6 via an MME interface 205. The operation of the transceiver circuitry 201 is controlled by a controller 207 in accordance with software stored in memory 209. The software includes, among other things, an operating system 211, a base station registration module 213, a UE registration module 215 and a CSG management module 217.

The base station registration module 213 is responsible for registering the HNB 11 with the MME 6 and the UE registration module 215 is responsible for registering the UE 3 with the HNB 11. The CSG management module 217 is responsible for configuring the HNB 11 to operate under one of the CSG access modes ('closed, 'hybrid', or 'open') and for setting up CSGs associated with the HNB 11.

The MME

Figure 3:
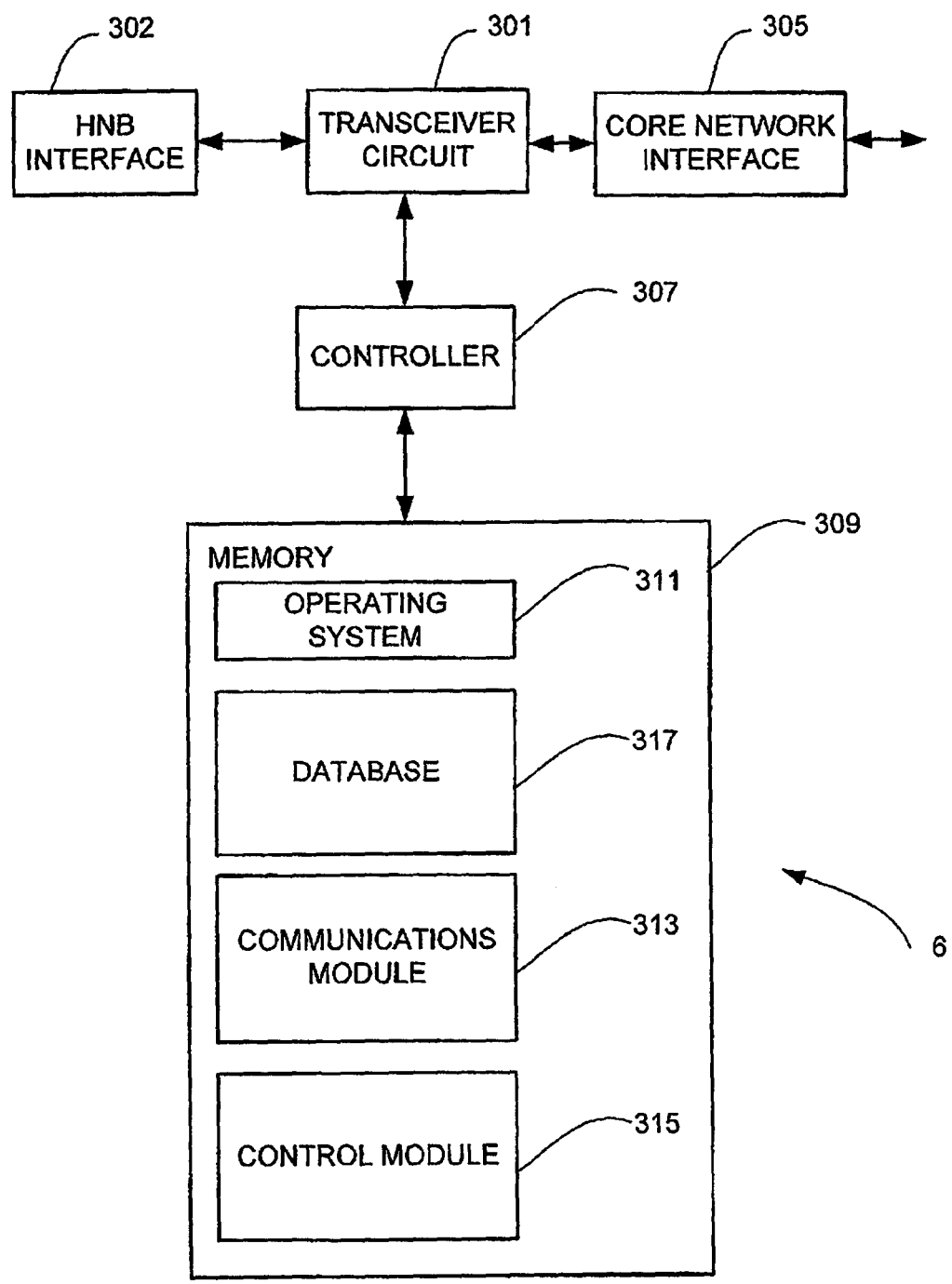
FIG. 3 is a block diagram of a mobility management entity (MME) forming part of the system shown in FIG. 1.

FIG. 3 is a block diagram illustrating the main components of the mobility management entity (MME) 6 shown in FIG. 1. As shown, the MME 6 includes transceiver circuitry 301 which is operable to transmit signals to, and to receive signals from the HNB 11 and a core network 8 via an HNB interface 302 and a core network interface 305, respectively. The operation of the transceiver circuitry 301 is controlled by a controller 307 in accordance with software stored in memory 309. The software includes, among other things an operating system 311, a communications module 313 and a control module 315. The memory also stores a database 317.

The communications module 313 is responsible for communicating with the HNB 11 via the HNB interface 302, and for communicating with the core network 8 via the core network interface 305. The control module 315 is responsible for recording in the database 317 an association between a UE 3 and one or more subscriber groups; and also for recording and updating the list of CSG-Ids received from the HNBs 11. In effect the MME 6 acts as a control-node for the network and is responsible for granting access to the UEs 3 via the base stations, such as the HNB 11.

In the above description, the MME 6 and the home base station 11 are described, for ease of understanding, as having a number of discrete modules (for example base station/telephone registration modules and the CSG management modules etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

To set up a communication link between the HNB 11 and the MME 6, the HNB 11 sends a configuration request, which contains application level configuration data needed for interoperability of the HNB 11 and MME 6 on the S1 interface (i.e. the interface between them). In case the HNB 11 is operating in closed or hybrid mode, the configuration request also comprises an Information Element (IE) with a list of the CSG-Ids that are associated with the HNB 11. The MME 6 stores the received CSG-Id list in its database 317.

The UE 3 may be a member of various subscriber groups, each of them also associated with a CSG-Id or several CSG-Ids. The MME 6 and the UE 3 store a 'white list', i.e. information relating to the memberships of the UE 3, which is used to control access by the UE 3 to the HNBs 11 operating in a closed subscriber group mode or in a hybrid mode. CSG-Ids that are on the white list for a given UE 3 indicate the closed subscriber groups that are open to the given UE 3.

When the UE 3 registers with the HNB 11 it performs an RRC Connection setup procedure. The HNB 11 then sends an INITIAL UE message to the MME in which it includes its CSG-Id. The MME 6 compares the received CSG-Id with the white list for the UE 3 (stored in the HSS, not shown), and also checks whether or not the CSG-Id list received from the HNB 11 at the time of HNB registration or subsequent reconfiguration and that is stored in database 317, includes the CSG-Id received in the INITIAL UE message. If it does, then the MME 6 will allow the UE to access the core network 8 through the HNB 11. Otherwise the UE is not allowed access and the INITIAL UE message is rejected.

Depending on the response from the MME 6, the HNB 11 will allow or deny access for the UE 3.

ENB Configuration Update

Whenever the CSG-Id list of the HNB 11 changes, for example, when its cells are added to or removed from certain closed subscriber groups, the HNB 11 sends an updated CSG-Id list to the MME 6 via the S1 interface. The HNB 11 and the MME 6 use the ENB Configuration Update procedure, which will be described in more detail below.

Figure 4:
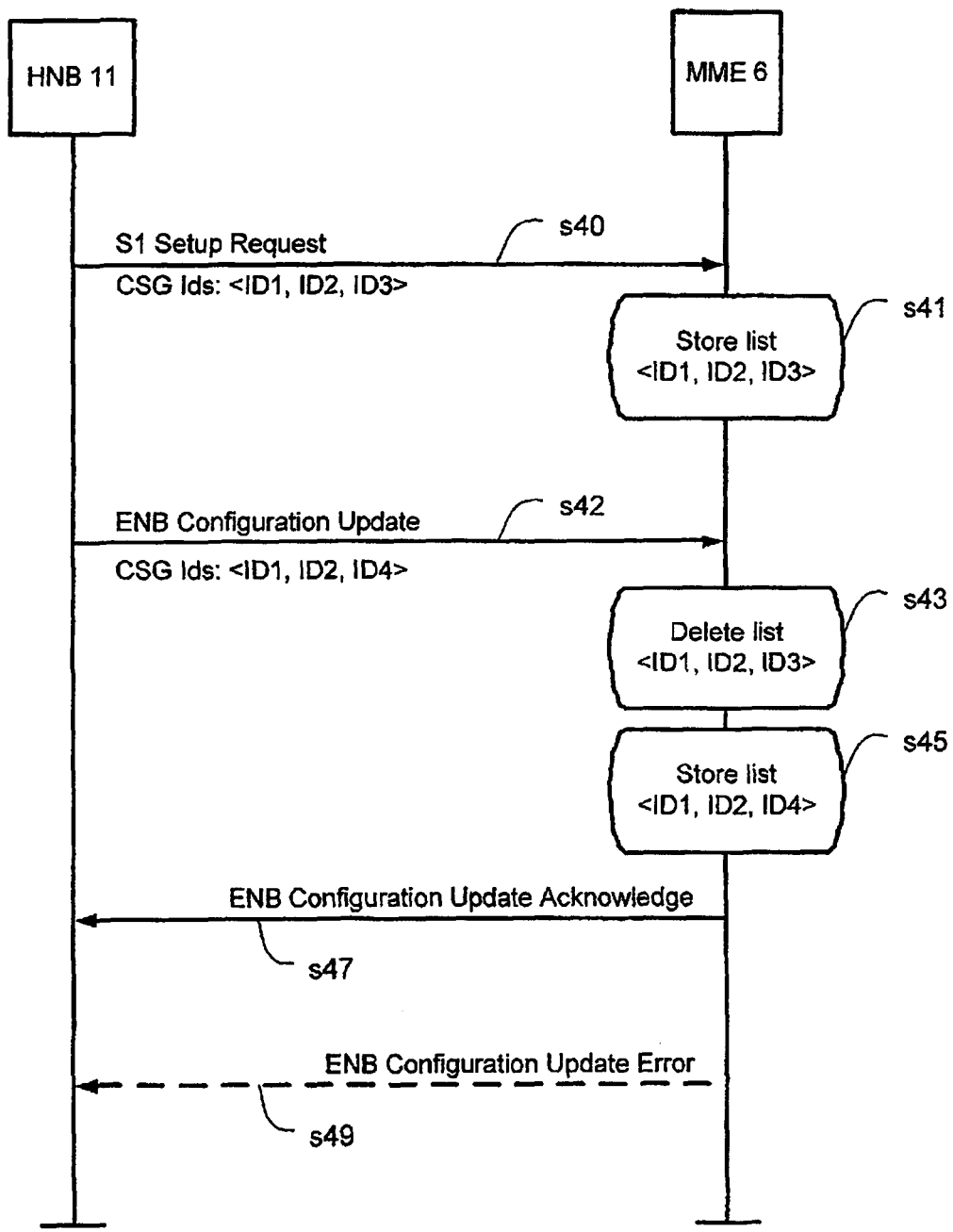
FIG. 4 is a signalling diagram indicating a procedure by which the MME updates a stored CSG-Id list according to the prior art.

FIG. 4, is a timing diagram illustrating a current configuration update procedure. As shown, the HNB 11 initiates a connection with the MME 6 by sending, in step s40, an S1 Setup Request message. The S1 Setup Request message includes the CSG-Ids (in this example: <ID1, ID2, ID3>) currently associated with the HNB 11. In step s41, the MME 6 stores the received CSG-Id list in its database 317. Whenever a change in the CSG-Id list occurs, the HNB 11 sends an ENB Configuration Update message, as shown in step s42. In order to update the CSG-Id list at the MME 6, the HNB 11 includes all CSG-Ids that need to be maintained, which are, in this example, <ID1, ID2>. The HNB 11 will also include any new CSG-Ids that are to be added to the previously sent list, in this case CSG-Id <ID4>. Upon receipt of the updated CSG-Id list, the MME 6 deletes its stored CSG-Id list in step s43. In step s45, the MME 6 stores the new CSG-Id list, which does not contain CSG-Id <ID3> anymore, but contains the new CSG-Id <ID4>, in addition to previous CSG-Ids <ID1, ID2>. In order to indicate to the HNB 11 that the CSG-Id list has been successfully updated, the MME 6 returns the ENB Configuration Update Acknowledge message in step s47. If there is any problem with the received ENB Configuration Update message, the MME 6 is configured to return the ENB Configuration Update Error message in step s49 (instead of step s47).

Some of the typical information elements that may be used in the ENB Configuration Update signalling message are illustrated in Table-1 below. The CSG-Id list information element is shown in row 5, and the CSG-Ids are listed in row 5.1. The remaining rows contain information relating to the HNB 11 that the MME 6 needs to receive when operating according to standard procedures. The meaning and usage of these other information elements are well-know to the person skilled in the art and are not central to the present invention.

TABLE 1

| 1 | Information Element/ Group Name | Presence | Range | IE type & reference | Semantics description | Criticality | Assigned Criticality |
|---|---|---|---|---|---|---|---|
| 2 | Message Type | M | | 9.2.1.1 | | YES | reject |
| 3 | eNB Name | O | | Printable String | | YES | ignore |
| 4 | Supported TAs | | | | Supported TAs in the eNB | GLOBAL | reject |
| 4.1 | >TAC | M | | 9.2.3.7 | Broadcasted TAC | — | |
| 4.2 | >Broadcast PLMNs | | | | Broadcasted PLMNs | — | |
| 4.2.1 | >>PLMN Identity | M | | 9.2.3.8 | | — | |
| 5 | CSG Id List | | | | | GLOBAL | reject |
| 5.1 | >CSG Id | <ID1, ID2, ID3, ID4> etc. | | 9.2.1.62 | | — | |

The procedures according to FIG. 4 are applicable in case of the closed or hybrid access modes of the HNB 11, i.e. when a list of CSG-Ids is required for providing access to the UEs 3. In case of the open access mode, steps s40 and s42 do not carry the CSG-Id list, i.e. rows 5 and 5.1 of Table-1 are not present in the ENB Configuration Update message, only other information relevant for the MME 6, such as the contents of rows 1 to 4.2.1. Therefore, if operating according to the current 3GPP standards documentation, the MME 6 will skip steps s43 and s45, and it does not store a CSG-Id list for the HNB 11, as it has not received one. However, the deletion of an existing CSG-Id list, in step s43, will not be actioned either, as it would require the receipt of the CSG Id list information element and a new CSG-Id list (rows 5 and 5.1 of Table-1) in the preceding step s42.

However, there is a significant drawback with the current procedure when the HNB 11 has set up a connection with the MME 6 in the closed or the hybrid access modes by sending the S1 Setup Request message in step s40, containing the CSG-Id list, as there is currently no way for the HNB 11 to inform the MME 6 to delete its copy of the CSG-Id list, in case the HNB 11 subsequently changes its operation to the open access mode. In this case, following the change of the HNB 11 to the open access mode, the ENB Configuration Update message in step s42 does not carry a CSG-Id list, thus the MME 6 cannot proceed to step s43 and consequently, it will maintain the previously stored CSG-Id list, which might result in an incorrect operation. For example, the MME 6 might allow access only for those UEs 3 whose CSG-Id matches the outdated CSG-Id list for the HNB 11, whilst denying access for those UEs 3 whose CSG-Id does not match the outdated CSG-Id list for the HNB 11, even though the HNB 11 is now operating in the open (non-CSG) access mode.

Figure 5:
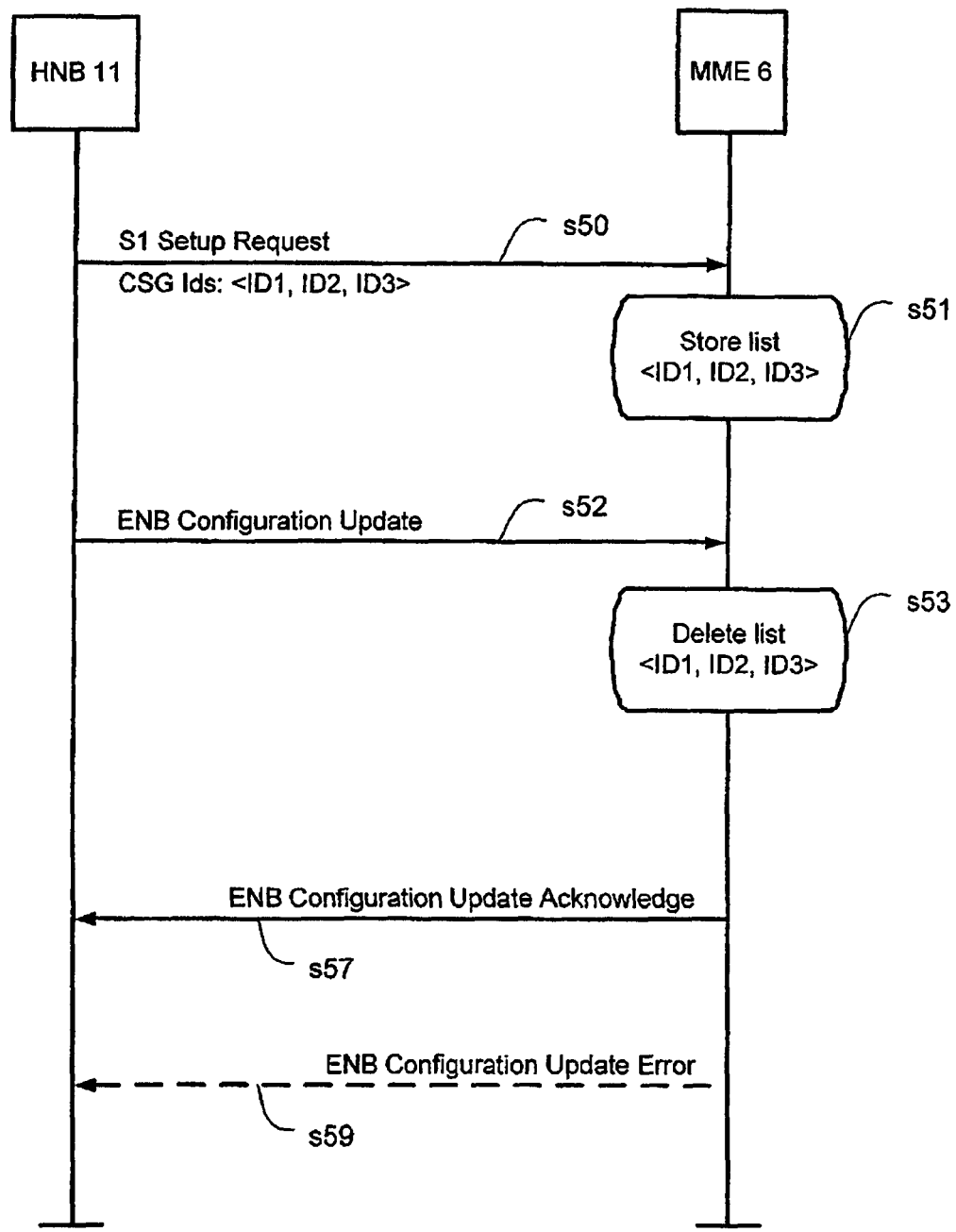
FIG. 5 is a signalling diagram indicating a procedure by which the MME updates the stored CSG-Id list according to an embodiment of the invention.

Therefore, the inventor has proposed the following modifications, which will be described with reference to FIG. 5. As shown in FIG. 5, the HNB 11 initiates a connection with the MME 6 by sending, in step s50, an S1 Setup Request message. As the HNB 11 initially operates in either the closed or the hybrid access mode, the S1 Setup Request message includes the CSG-Ids (in this example: <ID1, ID2, ID3>) currently associated with the HNB 11. In step s51, the MME 6 stores the received CSG-Id list in its database 317. In this example, the HNB 11 subsequently changes its operation to the open access mode, and thus its CSG-Id list is discarded. As a result of the mode change, the HNB 11 sends, in step s52, an ENB Configuration Update message that does not contain a CSG-Id list. Upon receipt of the message, the MME 6 processes the message and determines that there is no CSG-Id list included in the received message. In response, the MME 6 searches its database 117 to see if it already has a stored CSG-Id list for that HNB 11. If the MME 6 finds a stored CSG-Id list for that HNB 11, then it deletes the CSG-Id list in step s53. In order to indicate to the HNB 11 that the CSG-Id list has been successfully deleted, the MME 6 returns the ENB Configuration Update Acknowledge message in step s57. If there is any problem with the received ENB Configuration Update message, the MME 6 returns the ENB Configuration Update Error message in step s59 (instead of step s57).

The benefit of this solution is that the information elements in Table-1 remain unchanged. However, if the HNB 11 is operating in its hybrid or closed mode, then the HNB 11 has to include the CSG-Id list in any ENB Configuration Update message that it sends to the MME 6, otherwise the MME 6 will think the HNB 11 is changing to the open mode and will delete the currently stored CSG-Id list.

An alternative embodiment will now be described with reference to FIG. 6, which overcomes this issue with the embodiment described above. As shown, the HNB 11 initiates a connection with the MME 6 by sending, in step s60, an S1 Setup Request message. The S1 Setup Request message includes the CSG-Ids (in this example: <ID1, ID2, ID3>) currently associated with the HNB 11. In step s61, the MIME 6 stores the received CSG-Id list in its database 317. Whenever a change in the CSG-Id list occurs, the HNB 11 sends an ENB Configuration Update message to the MME 6, which is shown in step s62. In order to update the CSG-Ids stored in the database 317 of the MME 6, the HNB 11 includes in the ENB Configuration Update message all CSG-Ids that need to be deleted, which is, in this example, <ID3>, and also includes any CSG-Ids that are to be added, in this example <ID4>, to the CSG-Id list stored by the MME 6. Optionally, a list of CSG-Ids that are to be maintained, which are <ID1, ID2> might also be included. Upon receipt of the ENB Configuration Update message the MME 6 processes the message and identifies the CSG-IDs to be deleted and the CSG-Ids to be added. In step s63, the MME 6 deletes from its stored CSG-Id list for that HNB 11 those CSG-Ids that are marked for deletion, i.e. <ID3>. In step s65, the MME 6 adds to its stored CSG-Id list for that HNB 11 those CSG-Ids that are marked for addition, i.e. <ID4>. In step s66, the MME 6 maintains the remaining CSG-Ids in its stored list for that HNB 11, i.e. <ID1, ID2>. In one embodiment, the default operation of the MME 6 is to maintain any CSG-Ids that are not marked for deletion in the ENB Configuration Update message sent in step s62. In this case, an ENB Configuration Update message received without any CSG-Ids will result in no changes being made to the CSG-Id list that is stored in the database 317 of the MME 6. To indicate to the HNB 11 that the CSG-Id list has been successfully updated, the MME 6 returns the ENB Configuration Update Acknowledge message in step s67. If there is a problem with the received ENB Configuration Update message, the MME 6 is configured to return the ENB Configuration Update Error message in step s69 (instead of step s67).

Further details of the information elements that may be used in this embodiment are given below in Table-2, wherein rows 1 to 4.2.1 correspond to rows 1 to 4.2 of Table-1, respectively. Row 5 is the information element 'CSG-Id list', which is included in the ENB Configuration Update message in step s62, and it is used to indicate those CSG-Ids that are to be added to the CSG-Id list stored in the database 317 of the MME 6. Row 5.1 contains the CSG-Ids that are to be added to the CSG-Id list previously stored in the database 317 of the MME 6. Row 6 contains the information element 'Removed CSG-Id list' that is included in the ENB Configuration Update message in step s62. Row 6.1 contains the CSG-Ids that are to be deleted from the CSG-Id list previously stored in the database 317 of the MME 6. In this embodiment, CSG-Ids to be maintained do not need to be included in the ENB Configuration Update message in step s62 and are thus not defined in Table-2.

TABLE 2

| | Information Element/ Group Name | Presence | Range | IE type & reference | Semantics description | Criticality | Assigned Criticality |
|---|---|---|---|---|---|---|---|
| 1 | | | | | | | |
| 2 | Message Type | M | | 9.2.1.1 | | YES | Reject |
| 3 | eNB Name | O | | Printable String | | YES | ignore |
| 4 | Supported TAs | | | | Supported TAs in the eNB | GLOBAL | reject |
| 4.1 | >TAC | M | | 9.2.3.7 | Broadcasted TAC | — | |

TABLE 2-continued

| 1 | Information Element/ Group Name | Presence | Range | IE type & reference | Semantics description | Criticality | Assigned Criticality |
|---|---|---|---|---|---|---|---|
| 4.2 | >Broadcast PLMNs | | | | Broadcasted PLMNs | — | |
| 4.2.1 | >>PLMN Identity | M | | 9.2.3.8 | | — | |
| 5 | CSG Id List | | | | | GLOBAL | reject |
| 5.1 | >CSG Id | <ID4> | | 9.2.1.62 | | — | |
| 6 | Removed CSG Id List | | | | | | |
| 6.1 | >CSG Id | <ID3> | | 9.2.1.62 | | — | |

Figure 6:
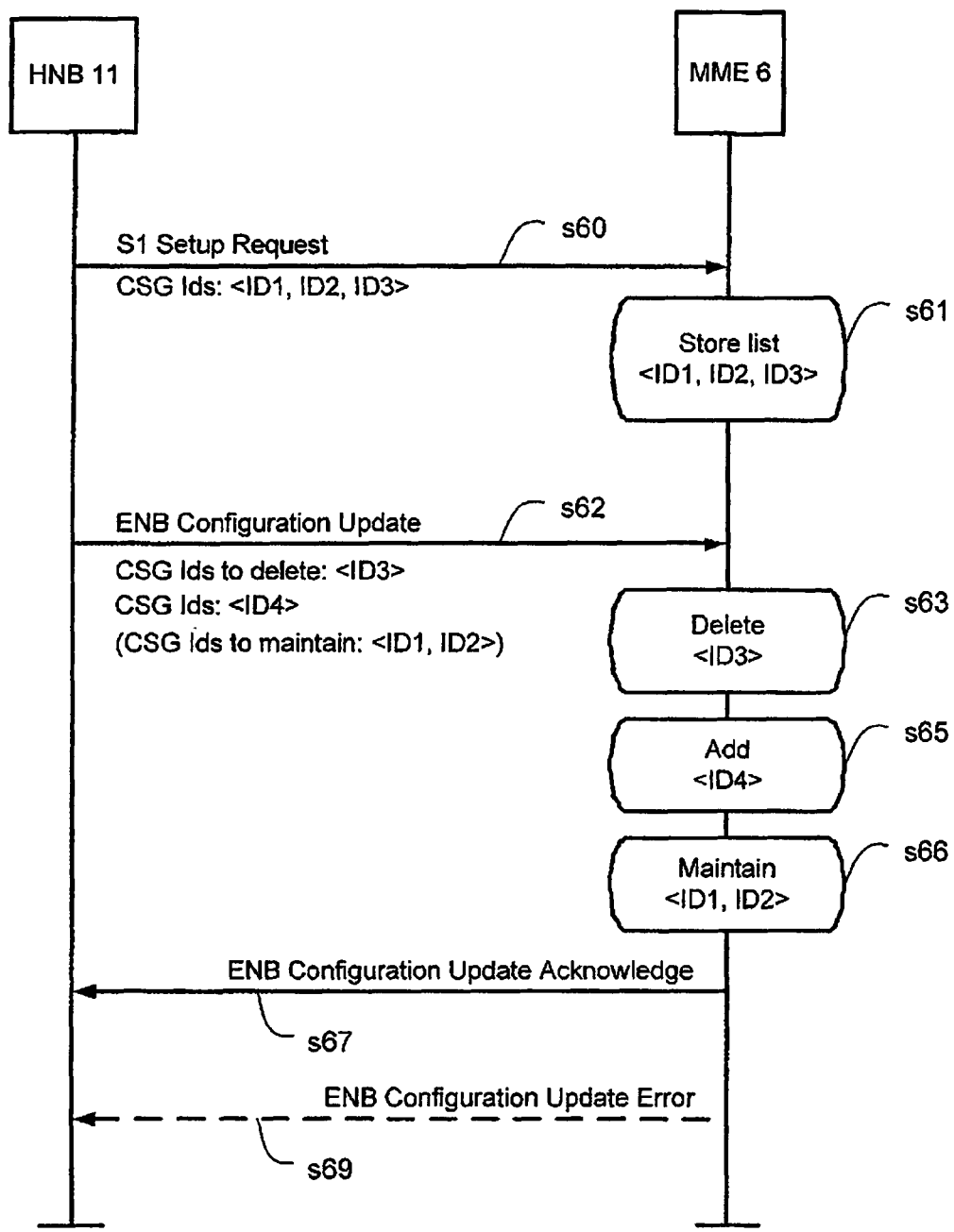
FIG. 6 is a signalling diagram indicating a procedure by which MME updates the stored CSG-Id list according to another embodiment of the invention.
Figure 7:
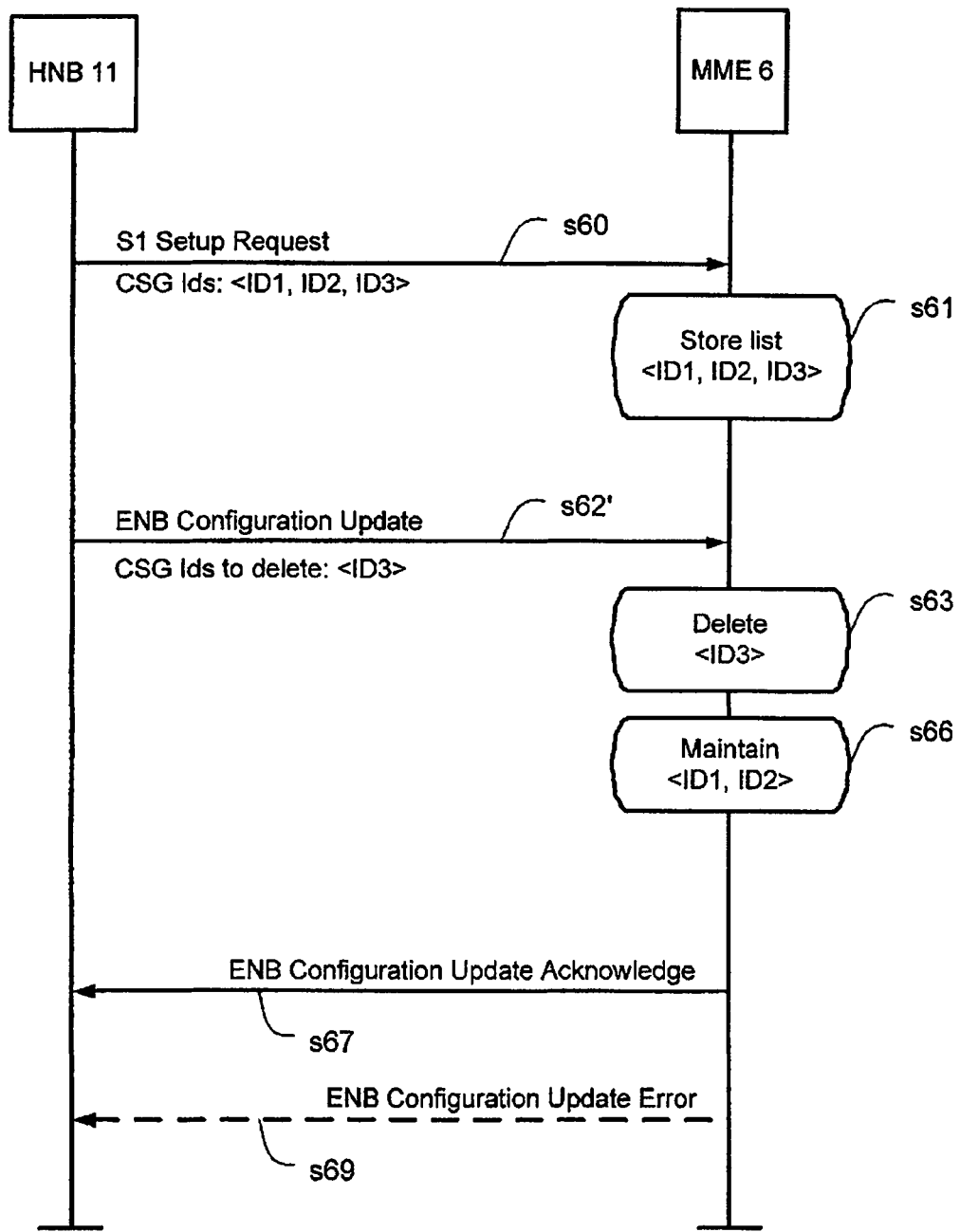
FIG. 7 is a signalling diagram indicating a procedure by which MME updates the stored CSG-Id list according to another embodiment of the invention.

One specific example of the embodiment discussed with reference to FIG. 6, is illustrated in FIG. 7, using the same steps and reference numbers. In this example there is one CSG-Id to be deleted (i.e. <ID3>) and the remaining CSG-Ids (i.e. <ID1, ID2>) are to be maintained in the database 317. Therefore, in step s62 (marked as step s62' in FIG. 7), the ENB Configuration Update message contains, in an information element, the CSG-Id to be deleted from the database 317 of the MME 6. In step s63, the MME 6 deletes this CSG-Id from the database 317 and skips step s65, since the received ENB Configuration Update message did not contain any CSG-Ids to be added to the database 317. The MME then continues its operation at step s66, in the same manner as in FIG. 6.

Figure 8:
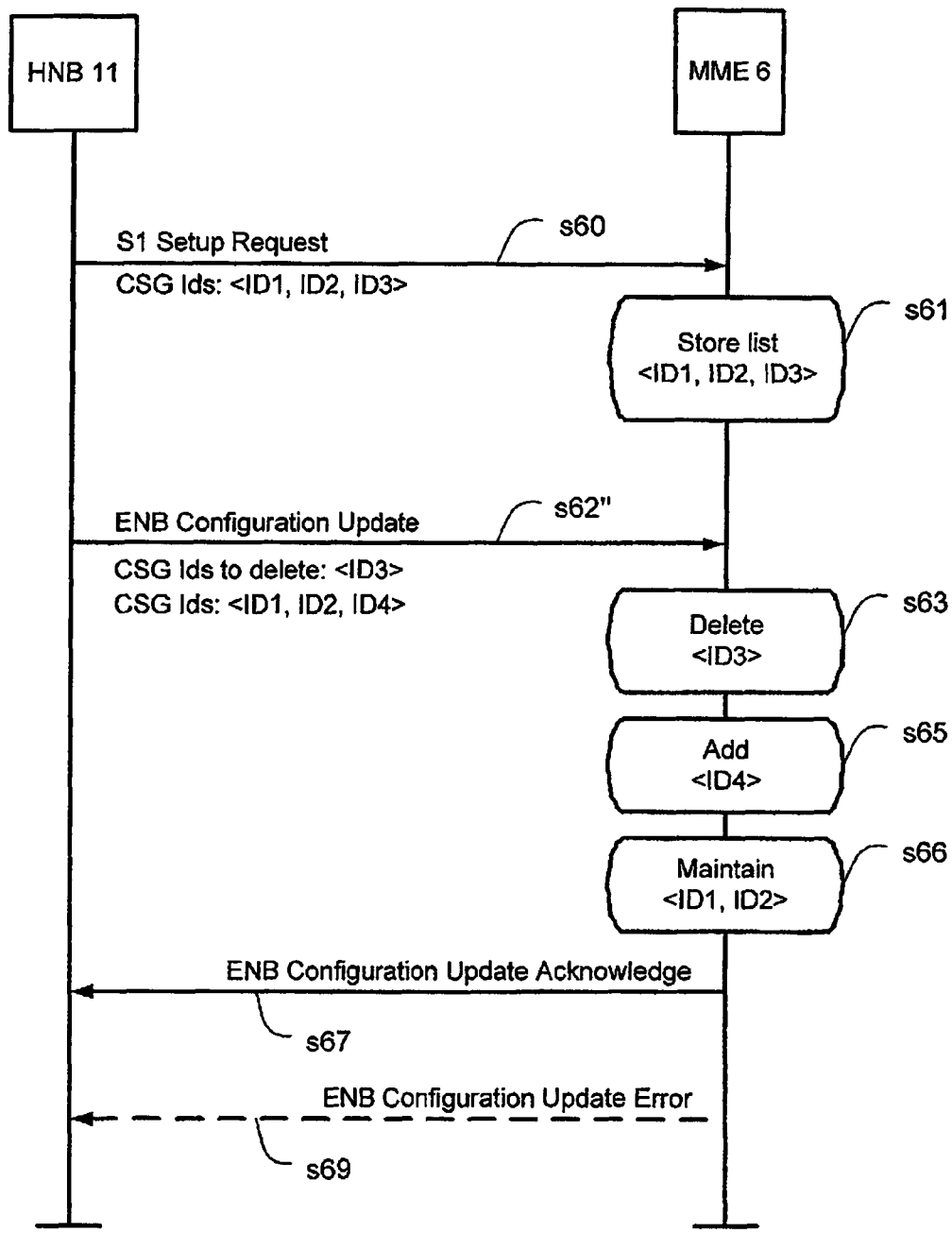
FIG. 8 is a signalling diagram indicating a procedure by which MME updates the stored CSG-Id list according to another embodiment of the invention.
Figure 9:
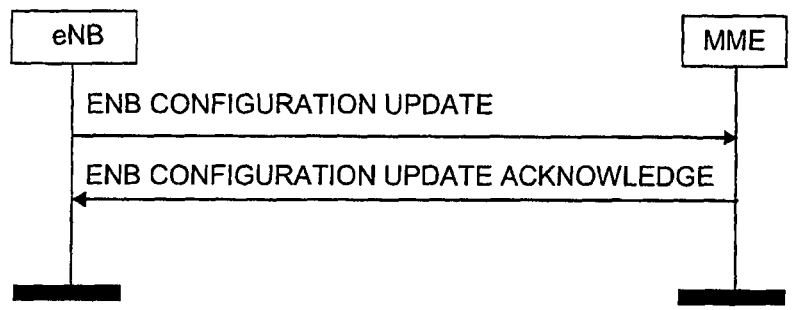
FIG. 9 is an ENB Configuration Update procedure in Successful Operation under 8.7.4.2 Successful Operation below.
Figure 10:
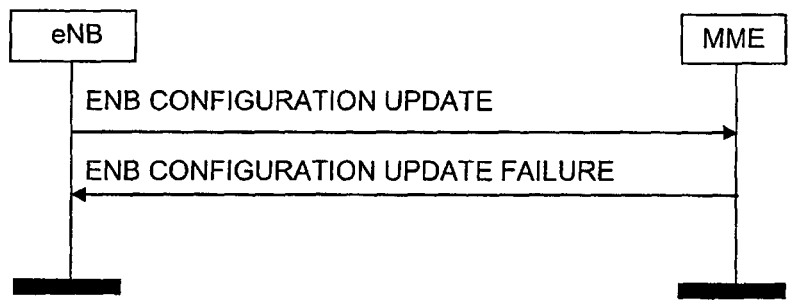
FIG. 10 is an ENB Configuration Update procedure in Unsuccessful Operation under 8.7.4.3 Unsuccessful Operation below.
Figure 11:
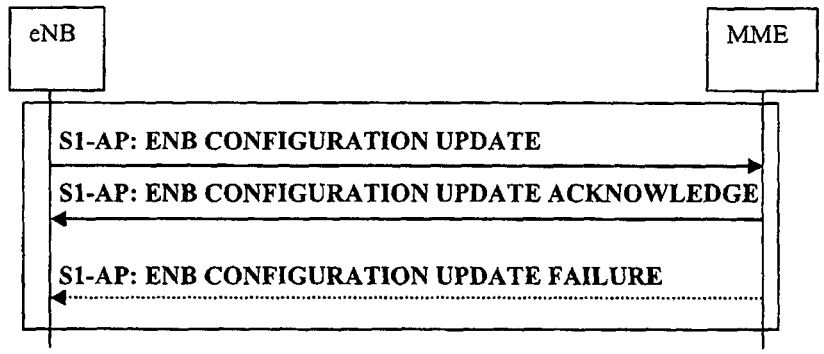
FIG. 11 is an eNB Configuration Update procedure under 19.2.2.9 eNB Configuration Update procedure below.

FIG. 8 illustrates a modification to the embodiment discussed with reference to FIG. 6, using the same steps and reference numbers. In this modification, in step s62 (marked as step s62" in FIG. 8), the ENB Configuration Update message contains the CSG-Ids to be added to, and the CSG-Ids to be maintained in, the database 317 of the MME 6 in the same information element, e.g. the 'CSG Id' information element (row 5.1) of Table-2. After step s62", the MME continues its operation at step s63, in the same manner as in FIG. 6.

Alternatively, the CSG-Ids to be maintained might be included in yet another information element (not shown) in Table-2, which would then comprise separate information elements (i.e. rows) for CSG-Ids to be added, deleted, and maintained, respectively.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

In the above embodiments, the HNB indicated a change in its operation mode implicitly, i.e. by omitting the CSG-Id list from the ENB Configuration Update message, or by marking all previous CSG-Ids for deletion. Alternatively, the HNB may indicate its current operation mode explicitly, such as using another suitable information element or a separate signalling message. In this case, when compared to the embodiment described with reference to FIG. 5, the CSG-Id list needs to be sent only when the list changes, and the list will be deleted by the MIME only when the operation mode of the HNB changes to the open access mode, and this change in access mode is explicitly indicated to the MIME.

In yet another embodiment, the CSG-Id list might have an expiry timer assigned to it, causing an automatic deletion of the CSG-Id list by the MME if the HNB does not re-send the current CSG-Id list before the expiry of the timer.

Various other modifications will be apparent to those skilled in the art and will not be described in further detail here.

The following is a detailed description of the way in which the present inventions may be implemented in the currently proposed 3GPP standard. Whilst various features may be described as being essential or necessary, this may only be the case for the proposed 3GPP standard, for example due to other requirements imposed by the standard. These statements should not, therefore, be construed as limiting the present invention in any way.

| CHANGE REQUEST | | | | |
|---|---|---|---|---|
| TS 36.413 | CR | xxxx | rev - | Current version: 10.2.0 |
| Title: | CSG Update in eNB Configuration Update | | | |
| Source to WG: | | NEC | | |
| Source to TSG: | | RAN3 | | |
| Work item code: | | TEI10 | | Date: 22/08/2011 |
| Category: | F | | | Release: Release-10 |

Reason for change: The current description about the CSG ID update in the eNB Configuration Update is ambiguous and could mean two possible interpretations.

The current text states—"If the supported CSG ID(s) is/are to be updated, the whole list of supported CSG IDs, including those that are not to be updated, shall be included in the CSG Id List IE. The MME shall overwrite the whole list of CSG Ids."

While the above statement is clear in the respect that if the eNB wants to change the CSG ID (s) that are previously indicated to the MME, it shall indicate the whole list of new supported CSG IDs.

On the other hand, if the eNB sends the blank list of CSG ID(s) this may lead to two possible interpretations:

(a) eNB does not want to change the previously configured CSG ID(s)

(b) eNB would not like to support the previously configured CSG ID(s)

While both of the above scenarios are relevant therefore it is necessary to clarify how the eNB will inform about the above two scenarios separately.

Summary of change: It is proposed to clarify that sending the blank list of CSG ID(s) while eNB already informed about some CSG ID(s) to the MME would mean that eNB no longer supports the previously configured CSG ID(s). If the eNB would like to continue with previously configured CSG ID(s) (without any change), it shall send the whole list of previously configured CSG ID(s) during every eNB Configuration Update procedure.

Impact assessment towards the previous version of the specification (same release):

This CR has isolated impact towards the previous version of the specification (same release).

This CR does not have any impact under functional and protocol point of view. This CR does not have ASN.1 impacts.

Consequences if not approved: Current specification is inconsistent and one scenario is clearly missing. This may lead of possible confusion in the implementation and IoT problems.

Clauses affected: 8.7.4

8.7.4 eNB Configuration Update 8.7.4.1 General

The purpose of the eNB Configuration Update procedure is to update application level configuration data needed for the eNB and the MME to interoperate correctly on the S1 interface. This procedure does not affect existing UE-related contexts, if any.

8.7.4.2 Successful Operation

The eNB initiates the procedure by sending an ENB CONFIGURATION UPDATE message to the MME including an appropriate set of updated configuration data that it has just taken into operational use. The MME responds with ENB CONFIGURATION UPDATE ACKNOWLEDGE message to acknowledge that it successfully updated the configuration data. If information element(s) is/are not included in the ENB CONFIGURATION UPDATE message, the MME shall interpret that the corresponding configuration data is/are not changed and shall continue to operate the S1 with the existing related configuration data unless specifically specified.

If the supported TA(s) is/are to be updated, the whole list of supported TAs, including those that are not to be updated, shall be included in the Supported TAs IE. The MME shall overwrite the whole list of TAs.

If the supported CSG ID(s) is/are to be updated, the whole list of supported CSG IDs, including those that are not to be updated, shall be included in the CSG Id List IE. The MME shall overwrite the whole list of CSG Ids. If the supported CSG ID(s) is/are to be maintained, the whole list of CSG IDs, as previously configured, shall be included in the CSG Id List IE. If CSG Id List IE not received then MME shall remove the whole list of previously configured CSG ID(s).

If the ENB CONFIGURATION UPDATE message contains the eNB Name IE, the MME may use this IE as a human readable name of the eNB.

If the Default Paging DRX IE is included, the MME shall overwrite any previously stored default paging DRX value for the eNB.

The updated configuration data shall be stored in both the eNB and the MME and used for the duration of the TNL association or until any further update is triggered by the eNB.

The eNB may initiate a further eNB Configuration Update procedure only after a previous eNB Configuration Update procedure has been completed.

8.7.4.3 Unsuccessful Operation

If the MME cannot accept the update, it shall respond with an ENB CONFIGURATION UPDATE FAILURE message and appropriate cause value.

If the ENB CONFIGURATION UPDATE FAILURE messages includes the Time To Wait IE, the eNB shall wait at least for the indicated time before reinitiating the ENB Configuration Update procedure towards the same MME. Both nodes shall continue to operate the S1 with their respective configuration data.

8.7.4.4 Abnormal Conditions

If the eNB after initiating eNB Configuration Update procedure receives neither an ENB CONFIGURATION UPDATE ACKNOWLEDGE nor an ENB CONFIGURATION UPDATE FAILURE message, the eNB may reinitiate a further eNB Configuration Update procedure towards the same MME, provided that the content of the new ENB CONFIGURATION UPDATE message is identical to the content of the previously unacknowledged ENB CONFIGURATION UPDATE message.

19.2.2.9 eNB Configuration Update Procedure

The eNB Configuration Update procedure is used to provide updated configured data in eNB. The eNB Configuration Update procedure is triggered by the eNB.

The eNB initiates the eNB Configuration Update procedure by sending the ENB CONFIGURATION UPDATE message including updated configured data like supported TAs and broadcasted PLMNs to the MME. In case one or more supported TA(s) needs to be updated, the eNB shall provide the whole list of TA(s), including those which has not been changed, in the ENB CONFIGURATION UPDATE message.

The MME responds with the ENB CONFIGURATION UPDATE ACKNOWLEDGE message to acknowledge that the provided configuration data are successfully updated.

The MME shall overwrite and store the received configuration data which are included in the ENB CONFIGURATION UPDATE message. Configuration data which has not been included in the ENB CONFIGURATION UPDATE message are interpreted by the MME as still valid except for CSG ID(s). In case of CSG ID(s), the previously configured CSG ID(s) are explicitly indicated every time in order for the same CSG ID(s) to be maintained. For the provided TA(s) the MME shall overwrite the whole list of supported TA(s).

In case the MME cannot accept the received configuration updates the MME shall respond with the ENB CONFIGURATION UPDATE FAILURE message including an appropriate cause value to indicate the reason of the denial. The MME optionally indicates in the ENB CONFIGURATION UPDATE FAILURE message when the eNB is allowed to reinitiate the eNB Configuration Update procedure towards the same MME again. For the unsuccessful update case the eNB and the MME shall continue with the existing configuration data.

This application is based upon and claims the benefit of priority from United Kingdom patent application No. 1113939.1, filed on Aug. 12, 2011, the disclosure of which is incorporated herein in its entirety by reference.

The invention claimed is:

1. A communications node for use in a communications network having a core network and a base station that can communicate with a plurality of mobile devices, the base station having a membership based access mode and a non-membership based access mode, the communications node comprising:
- a memory storing a list of membership identifiers associated with the base station when the base station is operating in said membership based access mode;
- a communication module receiving a configuration message from the base station indicating that the base station has changed from the membership based access mode to the non-membership based access mode; and
- a control module operable to process the received configuration message and to determine that the base station has changed from said membership based access mode to the non-membership based access mode and, in response to such determination, to delete the stored list of membership identifiers associated with the base station.

2. The communications node of claim 1, wherein the configuration message indicates that the base station has changed from the membership based access mode to the non-membership based access mode by not including a list of membership identifiers in the message.

3. The communications node of claim 1, wherein the configuration message indicates that the base station has changed from the membership based access mode to the non-membership based access mode by including data indicating the change of mode to said non-membership based access mode.

4. The communications node of claim 1, wherein the configuration message comprises an ENB Configuration Update Message.

5. The communications node of claim 1, which comprises a mobility management entity.

6. A communications node for use in a communications network having a core network and a base station that can communicate with a plurality of mobile devices, the base station having a membership based access mode and a non-membership based access mode, the communications node comprising:
- a memory storing a list of membership identifiers associated with the base station when the base station is operating in said membership based access mode;
- a communication module receiving an ENB Configuration Update Message from the base station indicating whether the communication node should update, maintain or delete the list of membership identifiers stored in said memory; and
- a control module operable to process the received ENB Configuration Update Message and to update, maintain or delete the list of membership identifiers stored in said memory in dependence upon the received ENB Configuration Update Message,
- wherein the control module is arranged to delete the list of membership identifiers by removing the list of membership identifiers from said memory to leave no list of membership identifiers stored in said memory for the base station.

7. The communications node according to claim 6, wherein the control module is arranged to update the membership list by over-writing the list with a list contained within the received ENB Configuration Update.

8. The communications node according to claim 6, wherein the control module is arranged to maintain the membership list by keeping the stored list of membership identifiers.

9. A base station for communicating with a plurality of mobile devices and a core network, the base station having a membership based access mode and a non-membership based access mode and comprising:
- a mobile subscriber registration module configured to register mobile subscribers for connection to the core network via the base station;
- a management module configured to manage a list of membership identifiers associated with the base station when the base station operates is said membership based access mode; and
- a base station registration module configured to send configuration messages to the core network,
- wherein the management module is configured to delete the list of membership identifiers when the access mode of the base station changes to the non-membership based access mode, and
- wherein the base station registration module is configured to send a configuration message to the core network indicating that the base station has changed from the membership based access mode to the non-membership based access mode.

10. The base station of claim 9, wherein the configuration message indicates that the base station has changed from the membership based access mode to the non-membership based access mode by not including a list of membership identifiers in the message.

11. The base station of claim 9, wherein the configuration message indicates that the base station has changed from the membership based access mode to the non-membership based access mode by including data indicating the change of mode to said non-membership based access mode.

12. The base station of claim 9, wherein the configuration message comprises an ENB Configuration Update Message.

13. The base station of claim 9, wherein the membership based access mode comprises either a closed subscriber group access mode or a hybrid access mode, and
wherein the non-membership based access mode comprises an open access mode.

14. A communications system comprising a plurality of mobile devices, a base station for communicating with the plurality of mobile devices and a core network in a communications network, and a communications node for use in the communications network, the base station having a membership based access mode and a non-membership based access mode,
the base station comprising:
- a mobile subscriber registration module configured to register mobile subscribers for connection to the core network via the base station;
- a management module configured to manage a list of membership identifiers associated with the base station when the base station operates is said membership based access mode; and
- a base station registration module configured to send configuration messages to the core network,
- wherein the management module is configured to delete the list of membership identifiers when the access mode of the base station changes to the non-membership based access mode, and
- wherein the base station registration module is configured to send a configuration message to the core network indicating that the base station has changed from the membership based access mode to the non-membership based access mode;
a communications node comprising:
- a memory storing a list of membership identifiers associated with the base station when the base station is operating in said membership based access mode;
- a communication module receiving a configuration message from the base station indicating that the base station has changed from the membership based access mode to the non-membership based access mode; and a control module operable to process the received configuration message and to determine that the base station has changed from said membership based access mode to the non-membership based access mode and, in response to such determination, to delete the stored list of membership identifiers associated with the base station.

15. A communications system comprising a plurality of mobile devices, a base station for communicating with the plurality of mobile devices and a core network in a communications network, and a communications node for use in the communications network, the base station having a membership based access mode and a non-membership based access mode, the base station comprising:

a mobile subscriber registration module configured to register mobile subscribers for connection to the core network via the base station;

a management module configured to manage a list of membership identifiers associated with the base station when the base station operates is said membership based access mode; and a base station registration module configured to send configuration messages to the core network, wherein the management module is configured to delete the list of membership identifiers when the access mode of the base station changes to the non-membership based access mode, and wherein the base station registration module is configured to send a configuration message to the core network indicating that the base station has changed from the membership based access mode to the non-membership based access mode, the communications node comprising:

a memory storing a list of membership identifiers associated with the base station when the base station is operating in said membership based access mode;

a communication module receiving a configuration message from the base station, the configuration message comprising one or more membership identifiers to be deleted from said list; and a control module deleting said one or more membership identifiers from the list of membership identifiers stored in said memory.

16. A communications system comprising a plurality of mobile devices, a base station for communicating with the plurality of mobile devices and a core network in a communications network, and a communications node for use in the communications network, the base station having a membership based access mode and a non-membership based access mode, the base station comprising:

a mobile subscriber registration module configured to register mobile subscribers for connection to the core network via the base station;

a management module configured to manage a list of membership identifiers associated with the base station when the base station operates is said membership based access mode; and a base station registration module configured to send configuration messages to the core network, wherein the management module is configured to delete the list of membership identifiers when the access mode of the base station changes to the non-membership based access mode, and wherein the base station registration module is configured to send a configuration message to the core network indicating that the base station has changed from the membership based access mode to the non-membership based access mode, the communications node comprising:

a memory storing a list of membership identifiers associated with the base station when the base station is operating in said membership based access mode;

a communication module receiving a configuration message from the base station indicating whether the communication node should update, maintain or delete the list of membership identifiers stored in said memory; and a control module operable to process the received configuration message and to update, maintain or delete the membership list stored in said memory in dependence upon the received configuration message.

17. A communications system comprising a plurality of mobile devices, a base station for communicating with the plurality of mobile devices and a core network in a communications network, and a communications node for use in the communications network, the base station having a membership based access mode and a non-membership based access mode, the base station comprising:

a management module configured to manage a list of membership identifiers associated with the base station when the base station operates in said membership based access mode; and a base station registration module configured to send a configuration message to the core network, the configuration message comprising the list of membership identifiers for storage in the core network, wherein the base station registration module is configured, in response to a change in the list of membership identifiers by the closed subscriber group management module, to send a subsequent configuration message to the core network comprising one or more membership identifiers to be deleted from the list stored in the core network, the communications node comprising:

a memory storing a list of membership identifiers associated with the base station when the base station is operating in said membership based access mode;

a communication module receiving a configuration message from the base station indicating that the base station has changed from the membership based access mode to the non-membership based access mode; and a control module operable to process the received configuration message and to determine that the base station has changed from said membership based access mode to the non-membership based access mode and, in response to such determination, to delete the stored list of membership identifiers associated with the base station.

18. A communications system comprising a plurality of mobile devices, a base station for communicating with the plurality of mobile devices and a core network in a communications network, and a communications node for use in the communications network, the base station having a membership based access mode and a non-membership based access mode, the base station comprising:
- a management module configured to manage a list of membership identifiers associated with the base station when the base station operates in said membership based access mode; and
- a base station registration module configured to send a configuration message to the core network, the configuration message comprising the list of membership identifiers for storage in the core network, wherein the base station registration module is configured, in response to a change in the list of membership identifiers by the closed subscriber group management module, to send a subsequent configuration message to the core network indicating whether the core network should update, maintain or delete the list of membership identifiers stored in the core network, the communications node comprising:
- a memory storing a list of membership identifiers associated with the base station when the base station is operating in said membership based access mode;
- a communication module receiving a configuration message from the base station indicating that the base station has changed from the membership based access mode to the non-membership based access mode; and
- a control module operable to process the received configuration message and to determine that the base station has changed from said membership based access mode to the non-membership based access mode and, in response to such determination, to delete the stored list of membership identifiers associated with the base station.

\* \* \* \* \*